(12) United States Patent
Lin

(10) Patent No.: US 10,624,487 B2
(45) Date of Patent: Apr. 21, 2020

(54) ANTI-OVERFLOW BREWING FILTER AND SPIRAL HANGING-EAR STRUCTURE COUPLED THERETO

(71) Applicant: Tzu-Chi Lin, Taipei (TW)

(72) Inventor: Tzu-Chi Lin, Taipei (TW)

( * ) Notice: Subject to any disclaimer, the term of this patent is extended or adjusted under 35 U.S.C. 154(b) by 0 days.

(21) Appl. No.: 15/906,220

(22) Filed: Feb. 27, 2018

(65) Prior Publication Data

US 2019/0090682 A1 Mar. 28, 2019

(30) Foreign Application Priority Data

Sep. 28, 2017 (TW) .................................. 106133282

(51) Int. Cl.
*A47J 31/06* (2006.01)

(52) U.S. Cl.
CPC ....... *A47J 31/0636* (2013.01); *A47J 31/0626* (2013.01)

(58) Field of Classification Search
CPC .......................... A47J 31/0636; A47J 31/0626

USPC ....... 210/482, 470, 473, 474, 478, 480, 481, 210/464, 465; 248/94
See application file for complete search history.

(56) References Cited

U.S. PATENT DOCUMENTS

| 956,332 A * | 4/1910 | Fuller |
| 4,863,601 A * | 9/1989 | Wittekind ............... A47J 31/02 210/474 |
| 2016/0001969 A1* | 1/2016 | Miyawaki ........... A47J 31/0636 426/82 |

* cited by examiner

*Primary Examiner* — Madeline Gonzalez
(74) *Attorney, Agent, or Firm* — Juan Carlos Marquez; Marquez IP Law Office, PLLC

(57) ABSTRACT

The present invention provides an anti-overflow brewing filter and a spiral hanging-ear structure coupled thereto, comprising: a filtering container which is a filter screen-based structure having a bottom portion and an surrounding wall extending upward from the bottom portion and forming with an opening; and a waterproof enclosure coupled to the opening. It may be further combined a spiral hanging-ear structure. With the practice of the present invention, It can make the infused liquid to be brewed beverage fully interact, without the problems brewing liquid spills.

8 Claims, 12 Drawing Sheets

# ANTI-OVERFLOW BREWING FILTER AND SPIRAL HANGING-EAR STRUCTURE COUPLED THERETO

BACKGROUND OF THE INVENTION

1. Technical Field

The present invention relates to an anti-overflow brewing filter and a spiral hanging-ear structure coupled thereto. More particularly, the invention relates to an anti-overflow brewing filter for use in preparing coffee, tea, or other brewed beverages, and a spiral hanging-ear structure coupled to the same.

2. Description of Related Art

The beverage markets have contributed a great deal to the rapid development of the global consumer market. Coffee, for example, has gradually become indispensable to many people's daily lives or even a symbol of tastefulness due to the fact that the caffeine in coffee can stimulate the central nervous system to keep a clear head, increase work efficiency, and enhance concentration and responsiveness for a limited period of time; that the same caffeine can help coffee drinkers overcome difficulties in sports and achieve better sports performances; and that caffeine also leads to vasoconstriction and can therefore be used to treat headaches attributable to dilated blood vessels.

To facilitate the preparation of coffee, paper filter cups were developed, one recent variation of which is the hanging-ear drip brew coffee filter P100 shown in FIG. 1. Typically, coffee is prepared by putting ground coffee (i.e., the beverage ingredient(s) 90 to be infused) into a filtering container 10 and then pouring hot water (i.e., a brewing liquid) into the filtering container 10, through which brewed coffee flows out as a result. During the preparation, however, hot water may rise so high above the ground coffee that it overflows the rim of the filtering container 10. As the overflowing hot water cannot extract flavors from the ground coffee effectively, the coffee obtained will be compromised in taste.

Apart from the foregoing drawback of the filtering container 10, the hanging ears P30 of the conventional hanging-ear drip brew coffee filter P100 have only one extended configuration when pulled outward and therefore cannot adapt to brewing containers (e.g., cups) with a relatively large opening. More specifically, the hanging ears P30 of the conventional hanging-ear drip brew coffee filter P100 can work well with a brewing container with a relatively small opening by sitting on two opposite portions of the rim respectively but, because of the limited extension of the hanging ears P30, cannot be used with a brewing container with a relatively large opening.

BRIEF SUMMARY OF THE INVENTION

The present invention provides an anti-overflow brewing filter and a spiral hanging-ear structure coupled thereto. The invention is intended mainly to solve the prior art problems stated above, namely: 1) a brewing liquid poured over the to-be-infused beverage ingredient(s) may rise above the beverage ingredient(s) and eventually overflow such that some of the brewing liquid cannot interact with the beverage ingredient(s) effectively, and 2) the conventional hanging ears cannot extend far enough to cope with brewing containers with a relatively large opening.

The present invention provides an anti-overflow brewing filter, comprising: a filtering container, which is a filter screen-based structure and has a bottom portion and a surrounding wall extending upward from the bottom portion, wherein the surrounding wall has a top portion formed with an opening; and a waterproof wall enclosure coupled to the opening.

The present invention provides an anti-overflow brewing filter, comprising: a filtering container, which is a filter screen-based structure and has a bottom portion and a surrounding wall extending upward from the bottom portion, wherein the surrounding wall has a top portion formed with an opening, and the surrounding wall has an intermediate height measured from the bottom portion and defined as a first depth; and a waterproof wall enclosure coupled to a portion of the filtering container that lies between an upper limit of the first depth and the opening.

The present invention provides a spiral hanging-ear structure coupled to a filtering container for use in preparing a brewed beverage, comprising a plate formed with at least one cut, wherein the cut renders the plate into a winding strip, and the winding strip is in a planar configuration during storage and is extended into a winding hanging ear when pulled outward.

Implementation of the present invention at least produces the following advantageous effects:
1) 100% interaction between the brewing liquid and the to-be-infused beverage ingredient(s) is ensured;
2) The resulting beverage will be greatly enhanced in flavor and quality; and
3) The spiral hanging-ear structure of the present invention can adapt to brewing containers of various opening sizes.

DETAILED DESCRIPTION OF THE INVENTION

Referring to FIG. 2A to FIG. 6B, the present invention provides an anti-overflow brewing filter 100 with/without spiral hanging-ear structures, wherein the anti-overflow brewing filter 100 includes a filtering container 10 and a waterproof wall enclosure 20. When not in use, the anti-overflow brewing filter 100 (and the spiral hanging-ear structures if present) can be folded along folding lines 105 (see FIG. 3A) into a flat configuration to facilitate storage or packaging in a box.

Figure 1A:
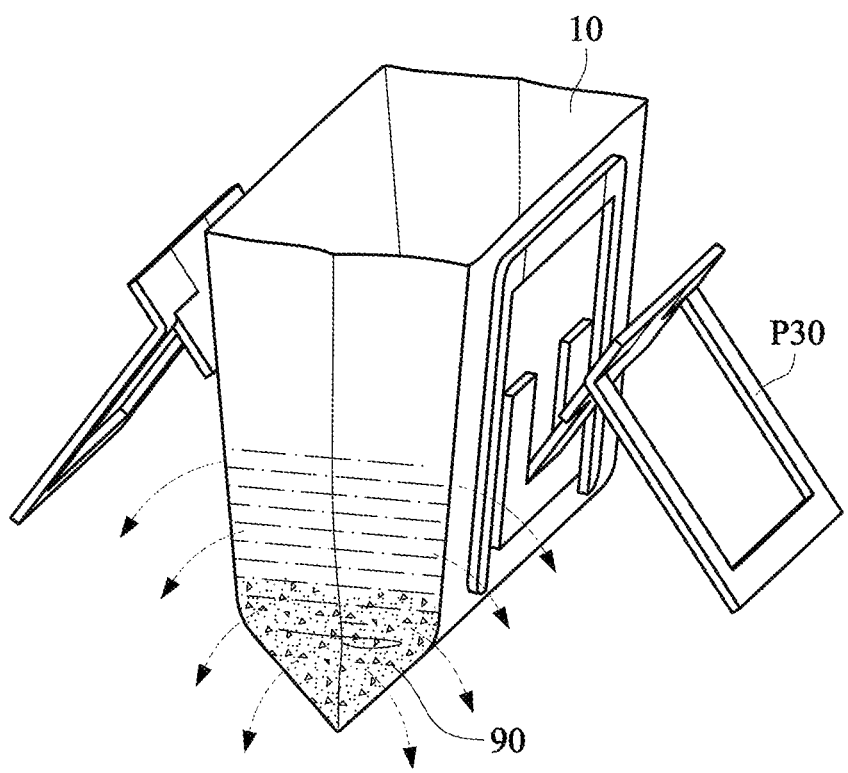
FIG. 1A is a perspective view of a conventional hanging-ear drip brew coffee filter.
Figure 1B:
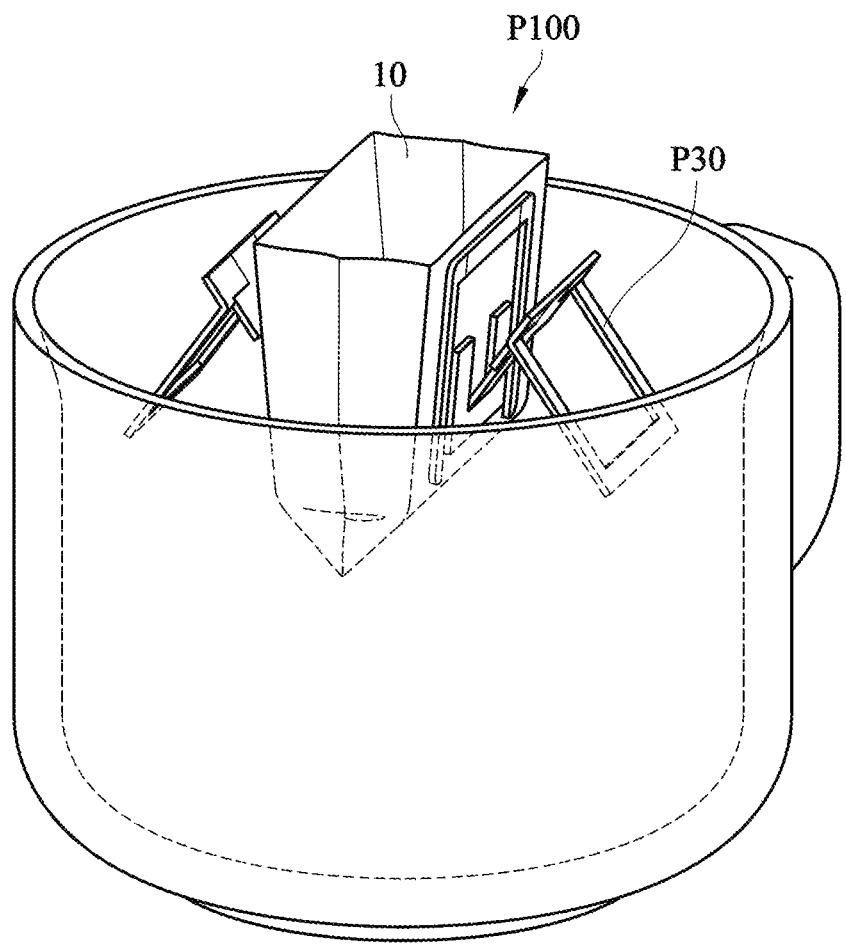
FIG. 1B shows that the hanging ears of the conventional hanging-ear drip brew coffee filter in FIG. 1A cannot extend far enough to reach the rim of a container with a relatively large opening.
Figure 2A:
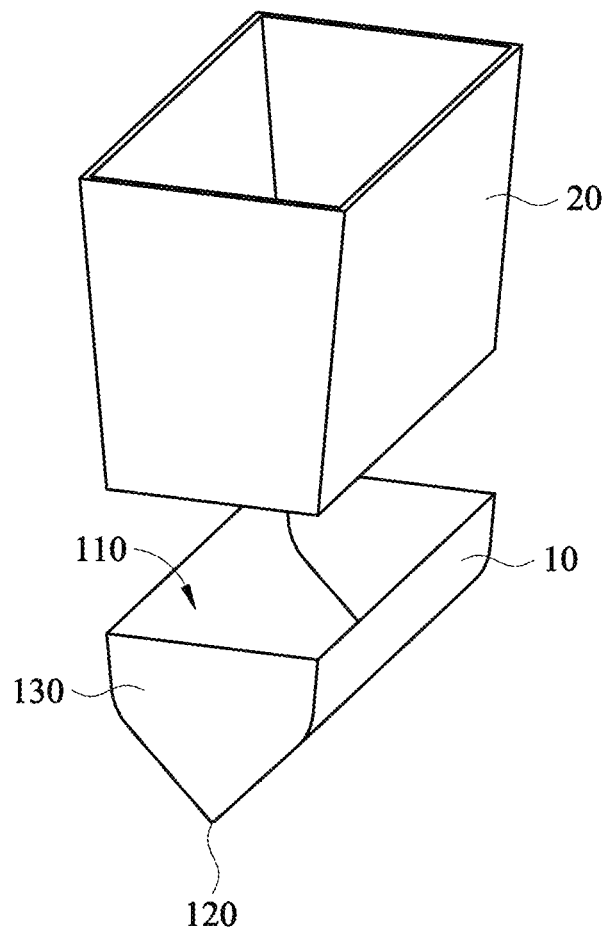
FIG. 2A is an exploded view of the anti-overflow brewing filter in the first embodiment of the present invention.
Figure 2B:
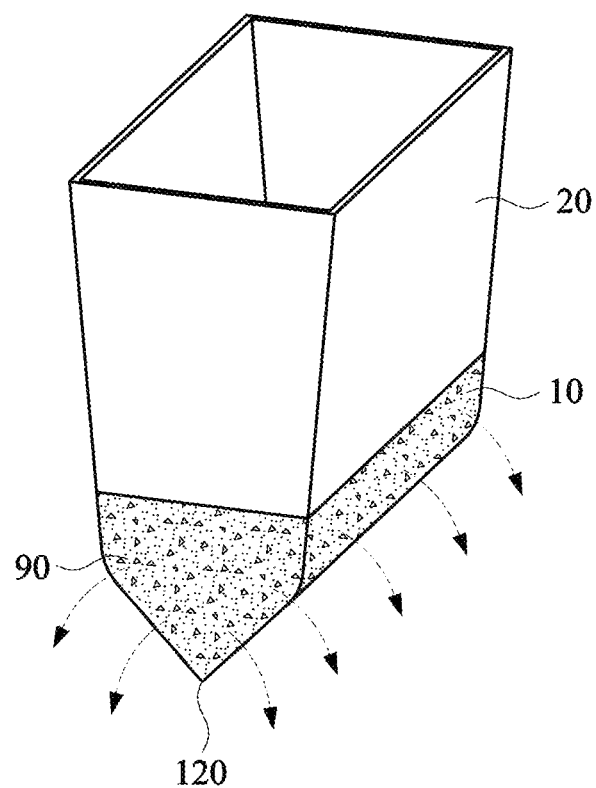
FIG. 2B shows a state of use of the anti-overflow brewing filter in FIG. 2A.
Figure 3A:
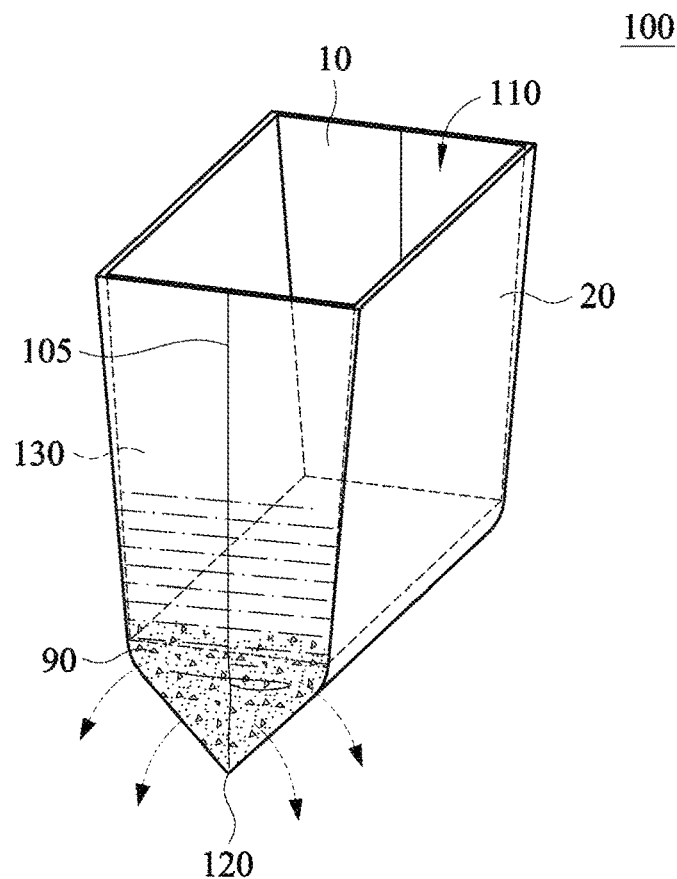
FIG. 3A is a perspective view of the anti-overflow brewing filter in the second embodiment of the present invention.
Figure 3B:
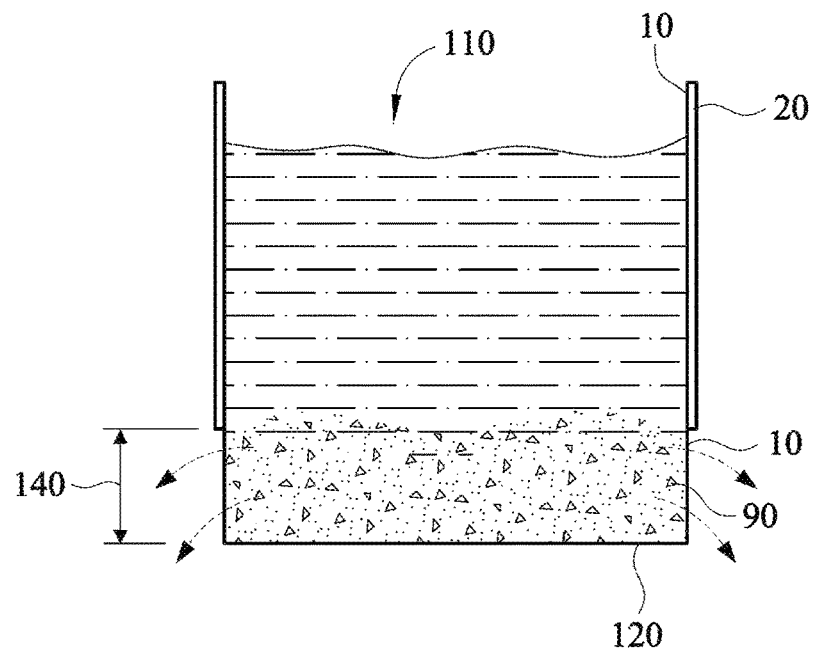
FIG. 3B is a sectional view of the anti-overflow brewing filter in FIG. 3A.
Figure 3C:
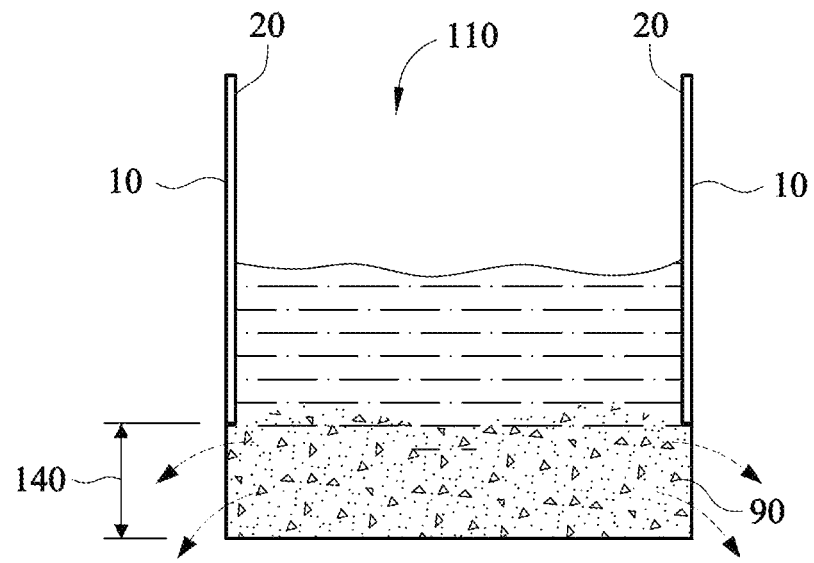
FIG. 3C is a sectional view of a variant of the anti-overflow brewing filter in FIG. 3A.
Figure 3D:
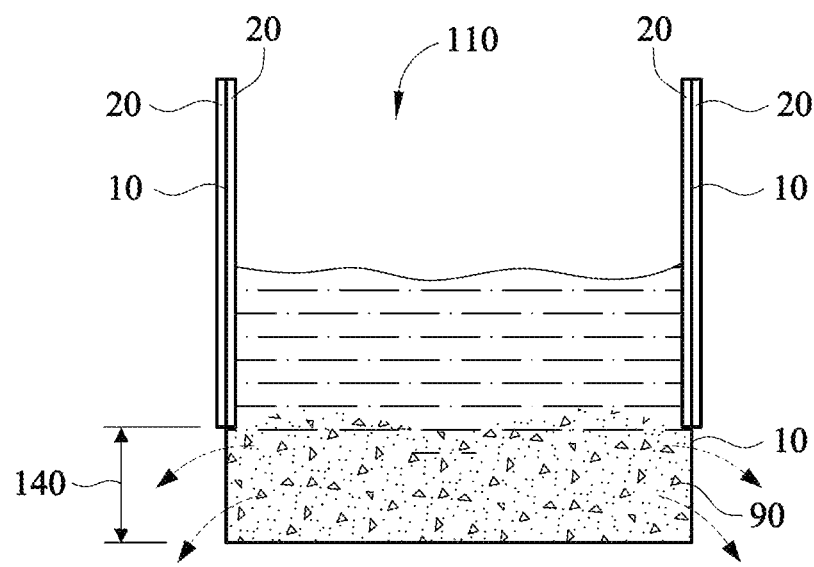
FIG. 3D is a sectional view of another variant of the anti-overflow brewing filter in FIG. 3A.

As shown in FIG. 2A and FIG. 2B, the anti-overflow brewing filter 100 in the first embodiment of the present invention includes: a filtering container 10 formed with an opening 110 at the top; and a waterproof wall enclosure 20 coupled to the opening 110.

The filtering container 10 is a filter screen-based structure. When preparing a brewed beverage, the beverage ingredient(s) 90 to be infused (e.g., ground coffee, dried tea leaves, or dried flowers or petals) is/are put into the filter screen-based structure, followed by a brewing liquid (e.g., hot water), which infuses the beverage ingredient(s) 90 to produce the desired beverage.

More specifically, the filtering container 10 is composed of a bottom portion 120 and a surrounding wall 130 extending upward from the bottom portion 120. The bottom portion 120 and the surrounding wall 130 jointly define a receiving space for receiving the beverage ingredient(s) 90. The opening 110 is formed at the top of the surrounding wall 130 to facilitate placement of the beverage ingredient(s) 90.

The waterproof wall enclosure 20 is formed of a waterproof material and is coupled to the opening 110. More specifically, the lower edge of the waterproof wall enclosure 20 is vertically coupled to the opening 110 of the filtering container 10 such that the waterproof wall enclosure 20 and the surrounding wall 130 are coupled together and form a wall barrier for use in the brewing and filtering process.

The waterproof wall enclosure 20 may be made of polylactic acid (PLA), polypropylene (PP), polyethylene (PE), polyethylene terephthalate (PET), or a waterproof paper material. Since the waterproof wall enclosure 20 is formed of a waterproof material, the brewing liquid will interact with the beverage ingredient(s) 90 in the anti-overflow brewing filter 100 without overflowing even if the beverage ingredient(s) 90 is/are higher than the opening 110 of the filtering container 10. This ensures that the brewing liquid will mix thoroughly with the beverage ingredient(s) 90.

As shown in FIG. 3A to FIG. 3D, the anti-overflow brewing filter 100 in the second embodiment of the present invention includes: a filtering container 10 formed with an opening 110 at the top and having a first depth 140; and a waterproof wall enclosure 20 coupled to a portion of the filtering container 10 that lies between the upper limit of the first depth 140 and the opening 110.

As in the first embodiment, the filtering container 10 in the second embodiment is a filter screen-based structure and has a bottom portion 120 and a surrounding wall 130 extending upward from the bottom portion 120, and the opening 110 is formed at the top of the surrounding wall 130. In the second embodiment, the surrounding wall 130 has an intermediate height measured from the bottom portion 120, and this intermediate height is defined as the first depth 140.

The waterproof wall enclosure 20 is also formed of a waterproof material. The waterproof wall enclosure 20 in this embodiment is coupled to the filtering container 10 over the area between the upper limit of the first depth 140 of the filtering container 10 and the opening 110 of the filtering container 10. Once the waterproof wall enclosure 20 is coupled to the surrounding wall 130 of the filtering container 10, the anti-overflow brewing filter 100 is completed.

The waterproof wall enclosure 20 may be a PLA, PP, PE, or PET coating. The waterproof wall enclosure 20 may be formed on the inner side, the outer side, or both the inner and outer sides of the surrounding wall 130.

The first embodiment and the second embodiment have the common feature that the filtering container 10 is cup-shaped or funnel-shaped. In addition, the filtering container 10 may be a PLA filter screen, a PP filter screen, a PE filter screen, a PET filter screen, or a coffee filter paper.

Figure 4:
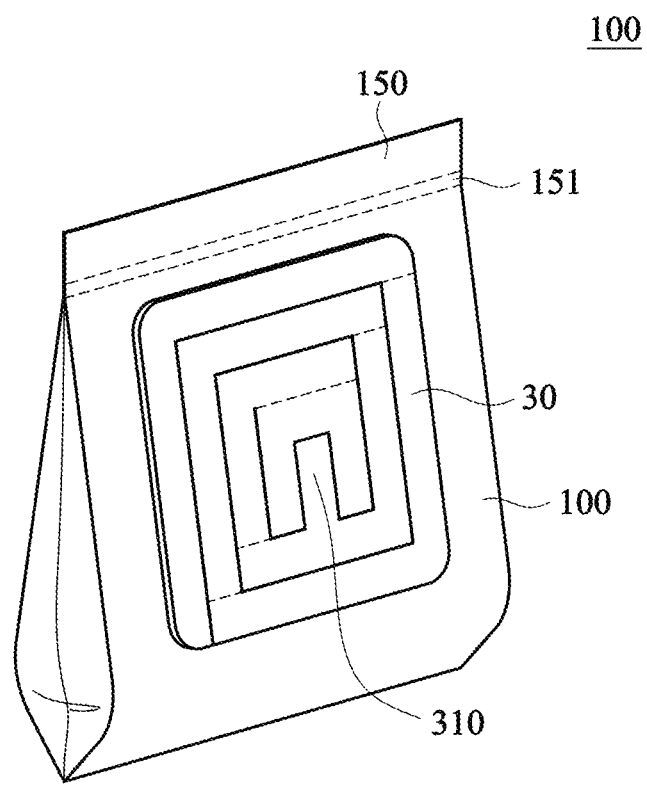
FIG. 4 is a perspective view of an anti-overflow brewing filter according to the present invention that is coupled with two spiral hanging-ear structures.
Figure 5A:
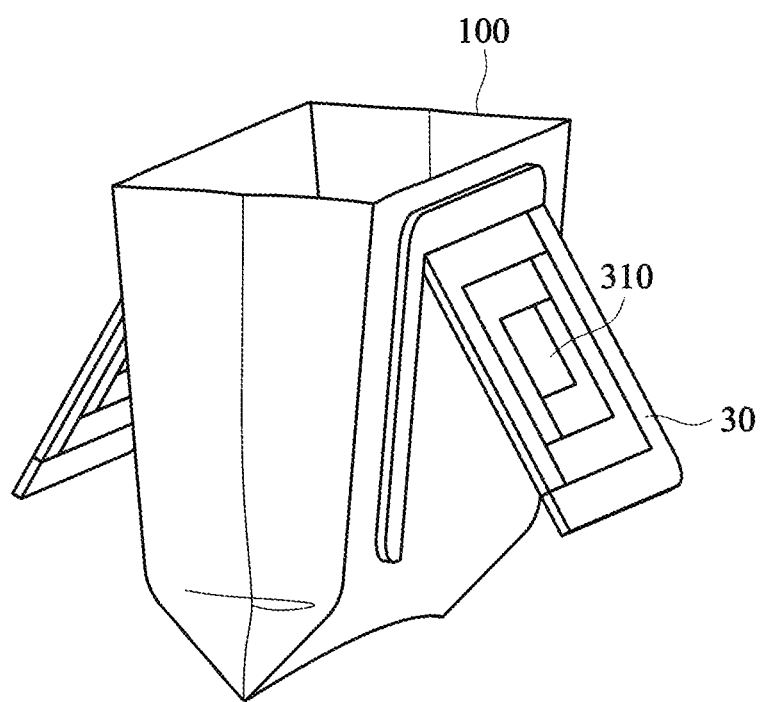
FIG. 5A shows an extended state of the spiral hanging-ear structures in FIG. 4.
Figure 5B:
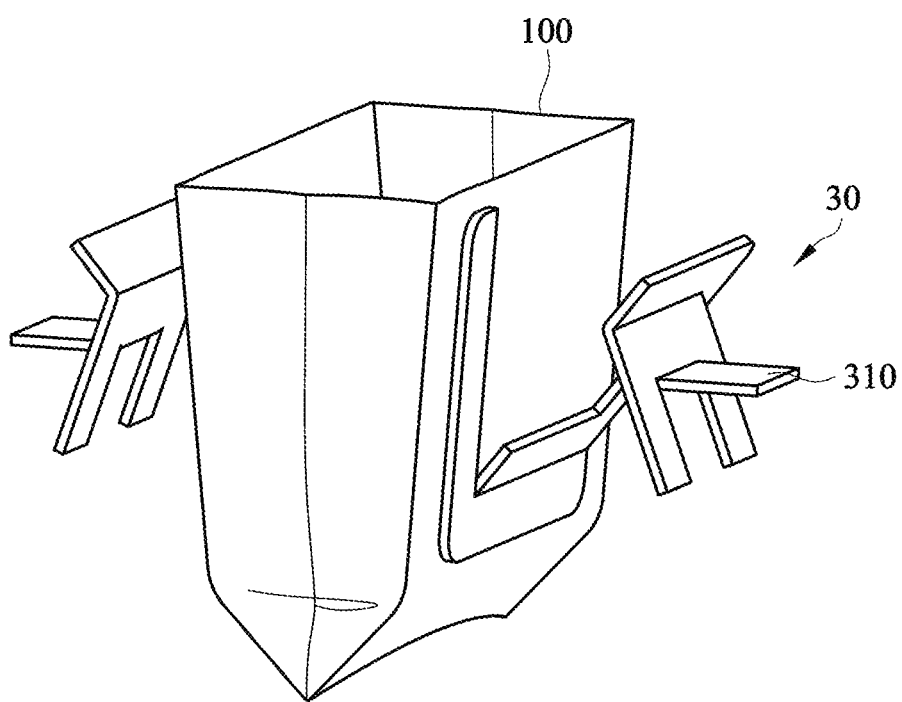
FIG. 5B shows another extended state of the spiral hanging-ear structures in FIG. 4.
Figure 5C:
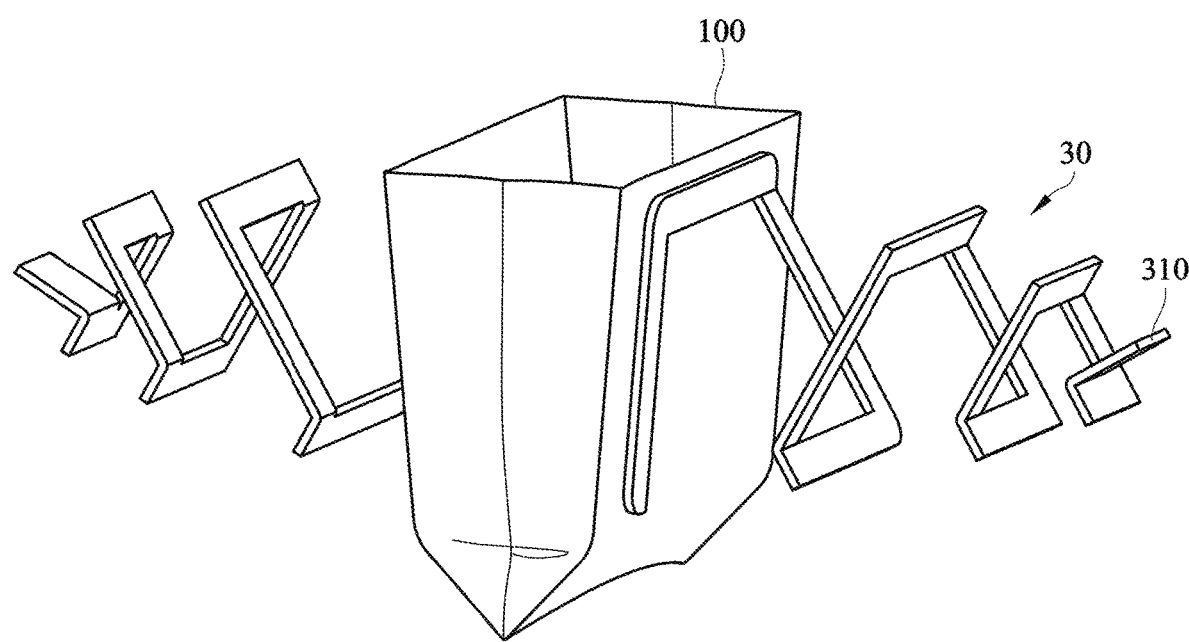
FIG. 5C shows yet another extended state of the spiral hanging-ear structures in FIG. 4.

As shown in FIG. 4 to FIG. 5C, the outer side of the anti-overflow brewing filter 100 may be coupled with a set of (e.g., two) spiral hanging-ear structures 30 to facilitate use. The spiral hanging-ear structures 30 can be coupled to any conventional brewing filter as well as that of the present invention. Each spiral hanging-ear structure 30 is a plate formed with at least one cut that renders the plate into a winding strip. This winding strip is in a planar configuration during storage and is extended into a winding hanging ear when pulled outward.

Each spiral hanging-ear structure 30 is an extensible spiral whose amount of extension depends on the number of turns of the spiral and which therefore can adapt to brewing containers of various opening sizes. Each spiral hanging-ear structure 30 is coupled at one end to the outer side of the anti-overflow brewing filter 100 and, when not in use, lies flat on the outer side of the anti-overflow brewing filter 100. To use the spiral hanging-ear structures 30, the user pulls them outward horizontally into an extended state.

Figure 6A:
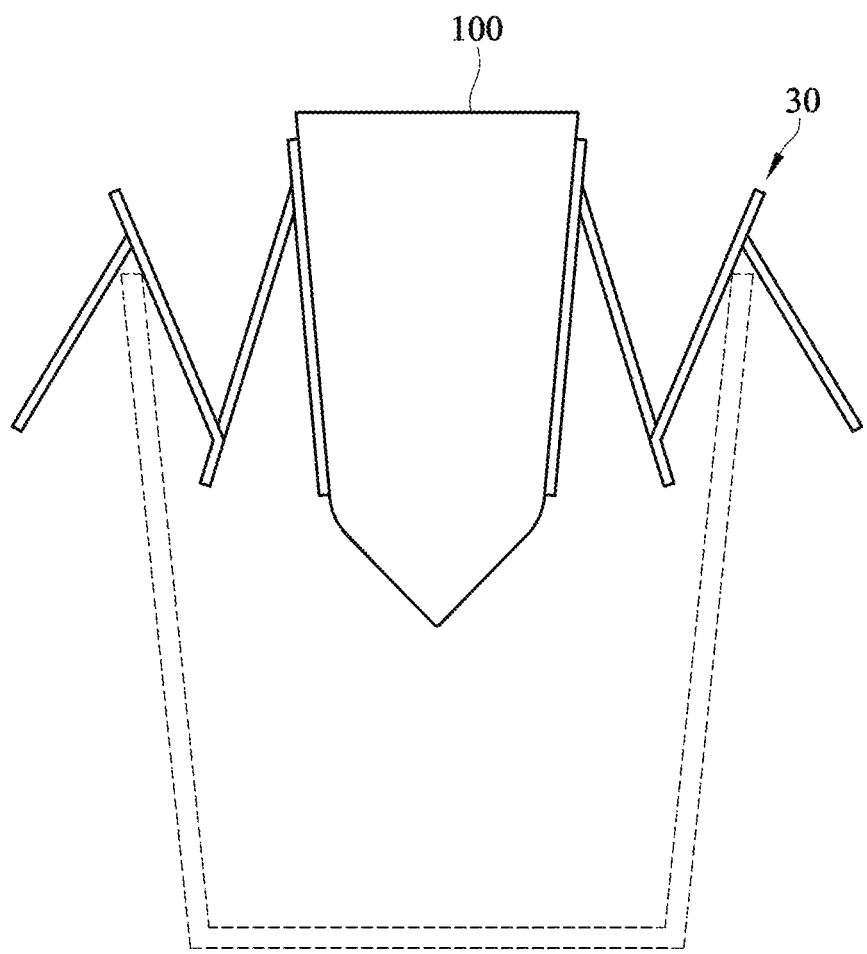
FIG. 6A shows a state of use of the spiral hanging-ear structures in FIG. 4.
Figure 6B:
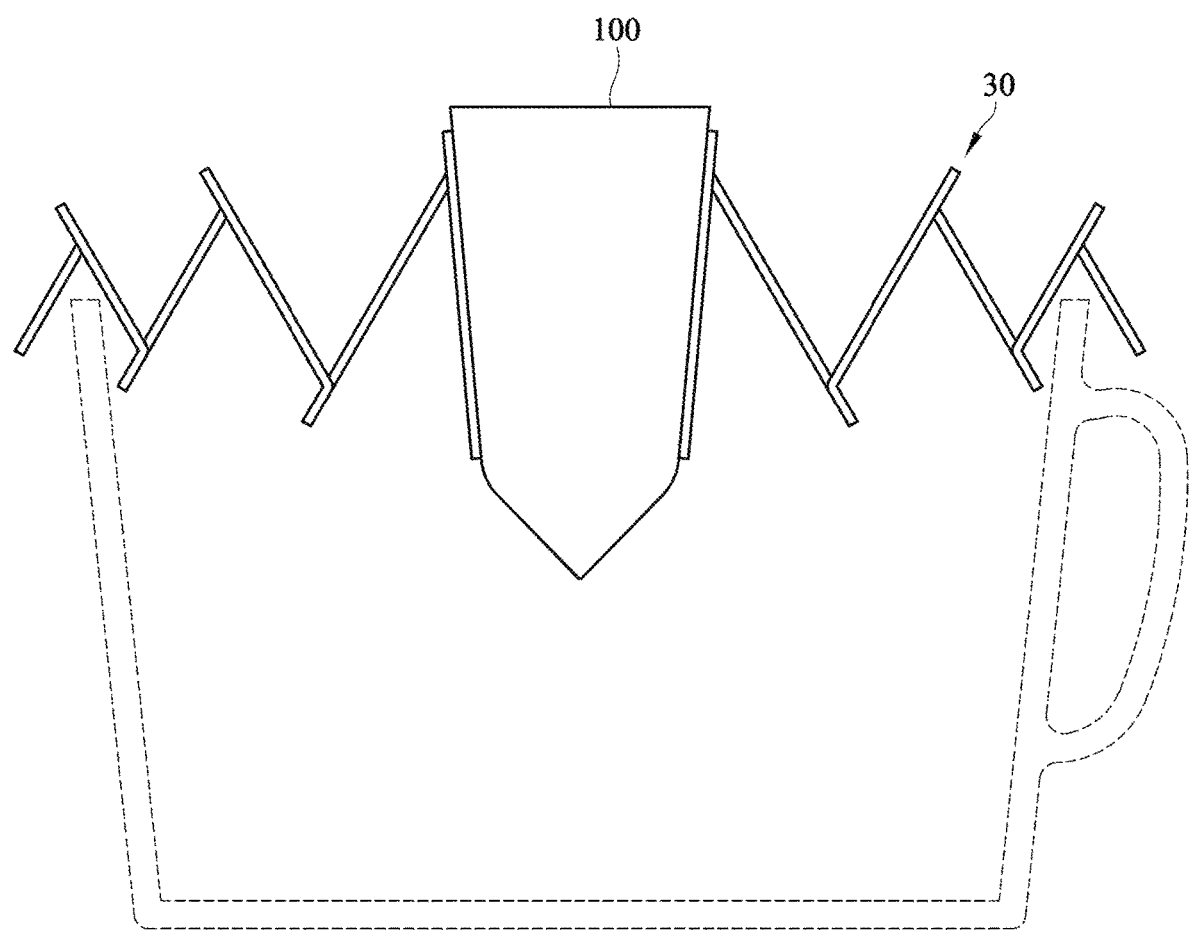
FIG. 6B shows another state of use of the spiral hanging-ear structures in FIG. 4.

As shown in FIG. 6A and FIG. 6B, the spiral hanging-ear structures 30 can be extended horizontally to different extents, depending on the opening of the container with which the spiral hanging-ear structures 30 are to be used. That is to say, the spiral hanging-ear structures 30 can form hanging ears adaptable to differently sized container openings. Moreover, the outer end of each spiral hanging-ear structure 30 may be provided with a pulling structure 310 (see FIG. 4 to FIG. 5C) so that the spiral hanging-ear structures 30 can be pulled with ease.

Referring back to FIG. 4, the anti-overflow brewing filter 100 in each of the foregoing embodiments may be pre-loaded with the beverage ingredient(s) 90 to be infused, before a seal 150 is formed at the opening 110. The seal 150 may be provided with a tearing line 151 to make it easier for the user to tear open the seal 150 and use the anti-overflow brewing filter 100.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. An anti-overflow brewing filter, comprising:
a filtering container, which is a filter screen-based structure and has a bottom portion and a surrounding wall extending upward from the bottom portion, wherein the surrounding wall has a top portion formed with an opening;
a waterproof wall enclosure coupled to the opening; and
a set of spiral hanging-ear structures coupled to a wall barrier formed by the waterproof wall enclosure and the surrounding wall coupled together;
wherein each of the spiral hanging-ear structures is adaptably extendable to form hanging ears configured for hanging the filtering container between the spiral hanging-ear structures on a container;
wherein the filtering container is a coffee filter paper.

2. The anti-overflow brewing filter of claim 1, wherein the filtering container is cup- or funnel-shaped.

3. The anti-overflow brewing filter of claim 1, wherein the waterproof wall enclosure is made of polylactic acid (PLA), polypropylene (PP), polyethylene (PE), polyethylene terephthalate (PET), or waterproof paper.

4. An anti-overflow brewing filter, comprising:
a filtering container, which is a filter screen-based structure and has a bottom portion and a surrounding wall extending upward from the bottom portion, wherein the surrounding wall has a top portion formed with an opening, and the surrounding wall has an intermediate height measured from the bottom portion and defined as a first depth;
a waterproof wall enclosure coupled to a portion of the filtering container that lies between an upper limit of the first depth and the opening; and
a set of spiral hanging-ear structures coupled to a wall barrier formed by the waterproof wall enclosure and the surrounding wall coupled together;
wherein each of the spiral hanging-ear structures has an outer end provided with a pulling structure;
wherein each of the spiral hanging-ear structures is adaptably extendable to form hanging ears configured for hanging the filtering container between the spiral hanging-ear structures on a container; and
wherein the filtering container is a coffee filter paper.

5. The anti-overflow brewing filter of claim 4, wherein the filtering container is cup- or funnel-shaped.

6. The anti-overflow brewing filter of claim 4, wherein the waterproof wall enclosure is a polylactic acid (PLA) coating, a polypropylene (PP) coating, a polyethylene (PE) coating, or a polyethylene terephthalate (PET) coating.

7. The anti-overflow brewing filter of claim 6, wherein the waterproof wall enclosure is formed on one or both of an inner side and an outer side of the surrounding wall.

8. A spiral hanging-ear structure coupled to a filtering container for use in preparing a brewed beverage, comprising at least a plurality of plates, each plate formed with at least one cut, wherein the cut renders the plate into a winding strip, and the winding strip is in a planar configuration during storage and is extended into a winding hanging ear when pulled outward;
wherein each winding hanging ear is adaptably extendable and configured for hanging the filtering container between the plurality of plates on a container via the winding hanging ears.

* * * * *